United States Patent
Meier (10) Patent No.: US 6,480,603 B1
(45) Date of Patent: Nov. 12, 2002

(54) DEVICE WHICH REDUCES CENTRAL OFFICE BATTERY CURRENT DURING MODEM CONNECTIONS

(75) Inventor: Rolf Georg Meier, Carp (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/186,643

(22) Filed: Nov. 6, 1998

(51) Int. Cl.[7] .............................................. H04M 1/00
(52) U.S. Cl. .................................. 379/413; 379/413.01
(58) Field of Search ........................... 379/399.01, 413, 379/413.01

(56) References Cited

U.S. PATENT DOCUMENTS

| 5,333,196 A | 7/1994 | Jakab ........................... 379/413 |
| 5,491,720 A | 2/1996 | Davis et al. ................... 375/222 |
| 5,699,414 A | 12/1997 | Telibasa ....................... 379/98 |

FOREIGN PATENT DOCUMENTS

JP    11261553 A   * 9/1999

* cited by examiner

Primary Examiner—Forester W. Isen
Assistant Examiner—Jefferey F. Harold (57) ABSTRACT

In the occurrence of a data modem establishing a data communication session over a telephone line, a method is disclosed for detecting the modem and subsequently reducing the telephone line current. Initially, when a new telephone call is begun, the line current is set as normal to a current sufficient to power a standard telephone handset. Subsequently, using modulation detection techniques, it is determined whether a modem data session has been initiated on the particular telephone line. If such a session has begun, the normal current level on the telephone line is unnecessary since data modems are locally powered. To minimize wasted power and reduce thermal problems caused by the modem dissipating the excessive current, a reduced current is set on the telephone line. This reduced current is either a predetermined modem current level or a minimum allowable current for the particular telephone line, as calculated within the line interface circuit.

24 Claims, 3 Drawing Sheets

DEVICE WHICH REDUCES CENTRAL OFFICE BATTERY CURRENT DURING MODEM CONNECTIONS

FIELD OF THE INVENTION

This invention relates generally to telephony and more specifically to loop currents within telephone networks.

BACKGROUND OF THE INVENTION

The use of modems and other data exchange equipment that utilize standard telephone lines and networks is increasing quickly in today's society. This rapid growth in modem use is especially pronounced due to the introduction and incredible popularity of the Internet. Today, not only are the number of data communication sessions expanding, but the length of call hold times corresponding to these sessions is also increasing. The key difficulty with this utilization of telephone networks for data communications is that telephone systems, as structured thus far, are specifically designed to handle voice calls and the problems associated with voice communications. Therefore, as currently configured, transmission of modem communications within telephone lines has not been optimized.

There are numerous areas in which such data communications can be made more efficient. One such area is the amount of line current provided by the telephone company to the individual telephone lines during normal operation. Standard telephones require the line interface circuits to supply the power needed for the operation of the handsets. To accomplish this, telephone line interface circuits ensure that a current which is typically 50 mA at 52V is supplied to the telephone lines and therefore the individual handsets.

The key difference, with respect to dial-up modems, is their significantly reduced need for a high telephone line current. Generally, modems are locally powered and do not utilize the power being supplied through the telephone wires, making the large current unnecessary. A minimum line current is required in order to maintain a noise free connection and to sense for an "off hook" or "on hook" condition, but a significantly reduced current from that required for standard telephone handsets will still allow modems to operate properly. In fact, modems would operate with reduced thermal dissipation if the line current being supplied to the modem was decreased during normal operations.

There exist telephone interfaces that operate with locally powered telephone handsets, such as Meridian Business System (MBS) telephones produced by Northern Telecom Limited of Montreal, Canada, that allow for the reduction in the line current in cases where the particular telephone handset does not require the full telephone line current. One example of an MBS telephone with this capability is MBS model number M5316. Unfortunately, this interface is specific to voice communications using telephone handsets with specially designed proprietary hardware. Also, dial-up modems are not utilized with the MBS telephones.

A system and procedure is thus needed that can reduce the telephone line current in cases that a modem or other data equipment session is initiated. Such a solution should be implemented without a significant increase in hardware or overall cost to the telephone network and without any changes to the modem hardware or software required. As well, preferably, such a network would detect the minimum current possible to maintain high quality communications and not allow the current to go below such a minimum level.

SUMMARY OF THE INVENTION

It is an object of the present invention to overcome the disadvantages of the prior art and, in particular, to provide an apparatus whereby telephone line current can be limited during data communications.

According to a first aspect, the present invention provides a control apparatus capable of being implemented within a line interface circuit coupled to a telephone station via a telephone line loop arranged to carry an ac current representative of voice or data and a dc current for powering a standard telephone handset, the control apparatus controlling operation of the line interface circuit by means of control logic operating within the control apparatus; and wherein the control logic operates to set the dc current on the telephone line loop to a predetermined first dc current level, to determine if the telephone station is of a first device type which requires less dc current on the telephone line loop than a standard telephone handset, and to set the dc current on the telephone line loop to a second lower dc current level if the telephone station is of the first device type.

According to a second aspect, the present invention provides a line interface circuit incorporating the control apparatus of the first aspect, the line interface circuit further comprising a communication apparatus for transmitting and receiving voice or data on the telephone line loop, a dc current detection apparatus for detecting the dc current on the telephone line loop, and a dc current adjustment apparatus for setting the dc current on the telephone line loop; and wherein the communication apparatus, the dc current detection apparatus, and the dc current adjustment apparatus are independently coupled between the telephone line loop and the control apparatus, and the control apparatus is coupled to an external apparatus.

According to a third aspect, the present invention provides in a control apparatus capable of being implemented within a line interface circuit coupled to a telephone station via a telephone line loop arranged to carry ac current representative of voice or data and a dc current for powering a standard telephone handset, a method of controlling the dc current on the telephone line loop, the method comprising the steps of: setting the dc current on the telephone line loop to a predetermined first dc current level; determining if the telephone station is of a first device type which requires less dc current on the telephone line loop than a standard telephone handset; and setting the dc current on the telephone line loop to a second lower dc current level if the telephone station is of the first device type.

BRIEF DESCRIPTION OF THE DRAWINGS

The preferred embodiment of the present invention is described with reference to the following figures, in which.

DETAILED DESCRIPTION OF THE PREFERRED EMBODIMENT

The schematic diagram illustrating a telephone network according to the preferred embodiment of the present invention is now described with reference to FIG. 1. This schematic diagram comprises, according to the preferred embodiment of the present invention, a standard dial-up modem 100, a subscriber telephone line loop 120 consisting of a twisted pair of wires 121,122 and represented in FIG. 1 as an equivalent circuit, and a line interface circuit 140 coupled to the telephone line loop 120 via a tip terminal 160 and a ring terminal 162.

The standard modem 100 comprises, in addition to a modulator (not shown) and a demodulator (not shown), a transformer 102, a capacitor 104, a relay 108, and a dc termination device 110. The capacitor 104 is coupled between one side of the transformer 102 and the wire 121 of the twisted pair, while the other side of the transformer 102 is coupled to the wire 122 of the twisted pair. The relay 108 and dc termination device 110 are connected in series between the two wires 121,122 of the twisted pair, hence they are connected in parallel with the transformer 102 and capacitor 104.

The current traversing the subscriber telephone line loop 120 comprises an ac component modulated to contain information signals and a dc component that is adjusted at the line interface circuit 140. In prior art setups, the dc component, hereinafter referred to as the voice current value $i_V$, is used to power the standard telephone handsets which are not locally powered. Although the dc current component is not utilized for power within data modems, a minimum modem current, hereinafter referred to as the modem current value $i_M$, is still required to reduce crossover distortion and to aid in the detection of "on hook" and "off hook" signals by the line interface circuit. As mentioned previously, the dc current required for a modem, that being the modem current value $i_M$, is significantly less than the voice current value $i_V$ required by a standard telephone handset.

The transformer 102 and the capacitor 104 together are used to transfer the ac current components being transmitted from the modulator, via the subscriber telephone line loop 120, to the line interface circuit 140 and transfer the ac signals being received at the demodulator from the line interface circuit 140. The capacitor 104 is of sufficient size to ensure only the desired ac component of the current is transferred, hence causing the dc component to be effectively isolated from the transformer 102.

The relay 108, controlled by circuitry within the modem 100, enables or disables the dc current flow within the telephone line loop 120 through the closing or opening of the relay circuit. The relay 108 is open circuited when the modem 100 is not in a data session, therefore having no requirement for current flow on the telephone line loop 120. When the modem 100 is within a data session, the relay 108 is close circuited, resulting in dc current, as adjusted by the line interface circuit 140, to flow through the telephone line loop 120.

The dc termination device 110 is a common component within a standard modem 100 used to dissipate the dc current component flowing through the subscriber telephone line loop 120 when the relay 108 is close circuited. Although modems, according to the preferred embodiment, require dc current on the telephone line loop 120 corresponding to the modem current value $i_M$, the power transferred to the modem 100 by the dc current is not utilized and therefore is simply dissipated within the dc termination device 110.

The equivalent circuit of the subscriber telephone line loop 120 comprises first and second loop resistances 123, 124, first and second longitudinal resistances 125,126, a capacitance 127, and a voltage source 128. These devices within the equivalent circuit represent the resistances, capacitances, and current sources that are normally inherent to a subscriber telephone line loop 120. The first and second loop resistances 123,124 are connected between the modem 100 and the line interface circuit 140 on the wires 121,122 respectively of the twisted pair. These resistances 123,124 represent the resistance within the actual telephone wires 121,122. The total loop resistance $R_L$ is considered to be the total of these resistances and therefore each loop resistance 123,124 within the equivalent circuit is half of the total loop resistance $R_L$.

In a typical telephone line loop, power lines (not shown) running in parallel with the telephone lines may induce additional ac currents called longitudinal currents $i_L$. The longitudinal resistances 125,126, the capacitance 127, and the voltage source 128 represent equivalent circuit components for generating the longitudinal induced currents $i_L$ which modify the current within the subscriber telephone line loop 120. The voltage source 128 and the capacitance 127 are coupled in series between a ground terminal 129 and a node 130. The first longitudinal resistance 125 is coupled between the node 130 and the telephone wire 121 coupled to the tip terminal 160 while the second longitudinal resistance 126 is coupled between the node 130 and the telephone wire 122 coupled to the ring terminal 162. Within the setup of FIG. 1, the longitudinal induced ac currents $i_L$ are shown to flow from the telephone wires 121,122 towards the node 130. This only depicts the direction of the ac longitudinal currents $i_L$ for half the cycle. Although, the description herein below is for the half cycle depicted on FIG. 1, it is recognized that during the other half cycle the direction of the longitudinal currents $i_L$ would be opposite.

A normal loop feed current $i_F$, which is generated and controlled at the line interface circuit as is described herein below, is combined with the longitudinal currents $i_L$ to generate the overall currents that flow through the loop resistances 123,124. During the half cycle of the longitudinal current $i_L$ depicted in FIG. 1, the loop resistance 123, which represents the resistance within the telephone wire 121 of the twisted pair, has a total traversing current equal to the sum $(i_F+i_L)$ of the feed loop current $i_F$ and the longitudinal current $i_L$. During the same cycle, the loop resistance 124, which represents the resistance within the telephone wire 122 of the twisted pair, has a total traversing current equal to the difference $(i_F-i_L)$ between the feed loop current $i_F$ and the longitudinal current $i_L$. These currents are equal to those traversing the tip and ring terminals 160,162 and flowing within the line interface circuit.

Figure 1:
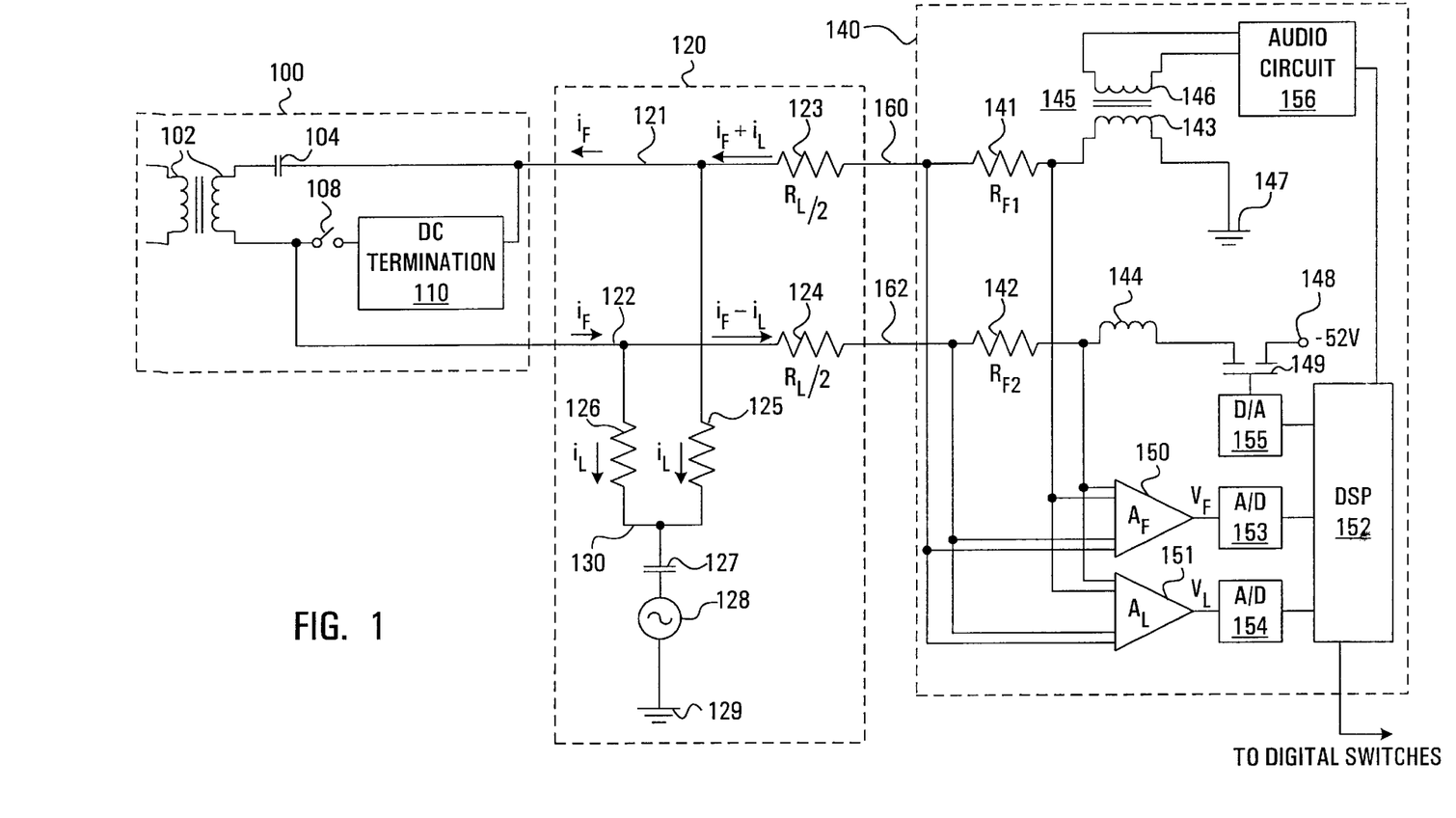
FIG. 1 is a schematic diagram illustrating a telephone network according to the preferred embodiment of the present invention.

The line interface circuit 140, as depicted in FIG. 1, is the implementation according to the preferred embodiment of the present invention. Coupled to the tip and ring terminals 160,162, within the line interface circuit 140, are tip and ring feed resistors 141,142 respectively, with corresponding resistances $R_{F1},R_{F2}$. Similar to the first and second loop resistances 123,124 during the half cycle shown for the longitudinally induced currents $i_L$, the currents traversing the tip and ring feed resistors 141,142 are respectively equal to the sum $(i_F+i_L)$ and difference $(i_F-i_L)$ of the loop feed current $i_F$ and the longitudinally induced current $i_L$. The tip and ring feed resistors 141,142 are further coupled with respective tip and ring windings 143,144 of a transformer 145 that further comprises a primary winding 146. The tip winding 143 is coupled between the tip feed resistor 141 and a ground terminal 147, while the ring winding 144 is coupled between ring feed resistor 142 and a power terminal 148 that, in the preferred embodiment, is set to −52V. Between the ring feed winding 144 and the power terminal 148 is a Field-Effect Transistor (FET) 149 used to adjust the dc current flowing through the subscriber's telephone line, as described herein below. It is noted that during the half cycle of the longitudinally induced current $i_L$ shown in which the current traversing the ring feed resistor 142 is equal to the difference $(i_F-i_L)$ of the loop feed current $i_F$ and the longitudinally induced current $i_L$, the loop feed current $i_F$ must remain larger than the longitudinally induced current $i_L$ in order to maintain the correct biasing within the FET 149.

Coupled to both ends of both the tip and ring feed resistors 141,142 are first and second differential amplifiers $(A_F, A_L)$ 150,151. These differential amplifiers 150,151, with the identical four input signals, are used to generate respective voltages $V_F$ and $V_L$ which are input to a Digital Signal Processor (DSP) 152 via first and second Analog-to-Digital (A/D) converters 153,154 respectively.

The first differential amplifier 150 is configured such that it adds the voltage across the tip feed resistor 141 with the voltage across the ring feed resistor 142. The following formula depicts the calculation of voltage $V_F$.

$$V_F = k_1[R_{F1}(i_F+i_L)+R_{F2}(i_F-i_L)]$$

In this formula, $k_1$ is a constant gain associated with the first differential amplifier 150. In the preferred embodiment, the tip and ring feed resistors 141,142 are of virtually equal impedance values. Therefore, the formula for the calculation of voltage $V_F$ simplifies to the following.

$$V_F = 2k_1 R_F i_F$$

With this formula, it can be seen that the voltage $V_F$ is representative of the loop feed current $i_F$ with a constant coefficient of $2k_1 R_F$.

The second differential amplifier 151 is configured such that it subtracts the voltage across the tip feed resistor 141 with the voltage across the ring feed resistor 142. Therefore, the following formula depicts the calculation of voltage $V_L$.

$$V_L = k_2[R_{F1}(i_F+i_L)-R_{F2}(i_F-i_L)]$$

In this formula, $k_2$ is a constant gain associated with the second differential amplifier 151. As described herein above, the tip and ring feed resistors 141,142 are of virtually equal values within the preferred embodiment. Therefore, the formula for the calculation of voltage $V_L$ simplifies to the following.

$$V_L = 2k_2 R_F i_L$$

With this formula, it can be seen that the voltage $V_L$ is representative of the longitudinally induced current $i_L$ with a constant coefficient of $2k_2 R_F$. The sign of the calculated voltage $V_L$ indicates the half cycle of the longitudinally induced current $i_L$.

The voltages $V_F$ and $V_L$ are input to the first and second A/D converters 153,154 respectively and are converted to first and second digital streams, subsequently input to the DSP 152. Utilizing the values for the loop feed current $i_F$ and longitudinally induced current $i_L$ inherent within these digital streams, the DSP, with use of a programmed algorithm as will be described herein below with reference to FIG. 2, inputs a third digital stream into a Digital-to-Analog (D/A) converter 155. The D/A converter 155 converts the third digital stream into an analog signal that is subsequently input to the gate of the FET 149. The voltage applied to the gate of the FET 149 determines the overall dc current supplied to the subscriber's telephone line loop. Therefore, by controlling the input to the D/A converter 155, the DSP 152 controls the current flowing through the telephone line loop.

In the preferred embodiment, the D/A converter 155 is implemented similar to a circuit disclosed within U.S. Pat. No. 5,333,196 entitled "Current Limiting Battery Feed Arrangement" by Jakab, assigned to the assignee of the present invention, and incorporated herein by reference. Specifically, the D/A converter 155, according to the preferred embodiment, is similar to the circuit described with reference to FIG. 4 within the '196 patent that controls reference voltage $V_{ref}$.

Also coupled to the DSP 152 is an audio circuit 156 further coupled to the primary winding 146 within the transformer 145. Through the audio circuit 156 and the transformer 145, the DSP 152 transmits and receives modulated information signals to and from the modem 100. The DSP 152 communicates with the remainder of the telephone network (not shown) via digital switches (not shown).

Figure 2:
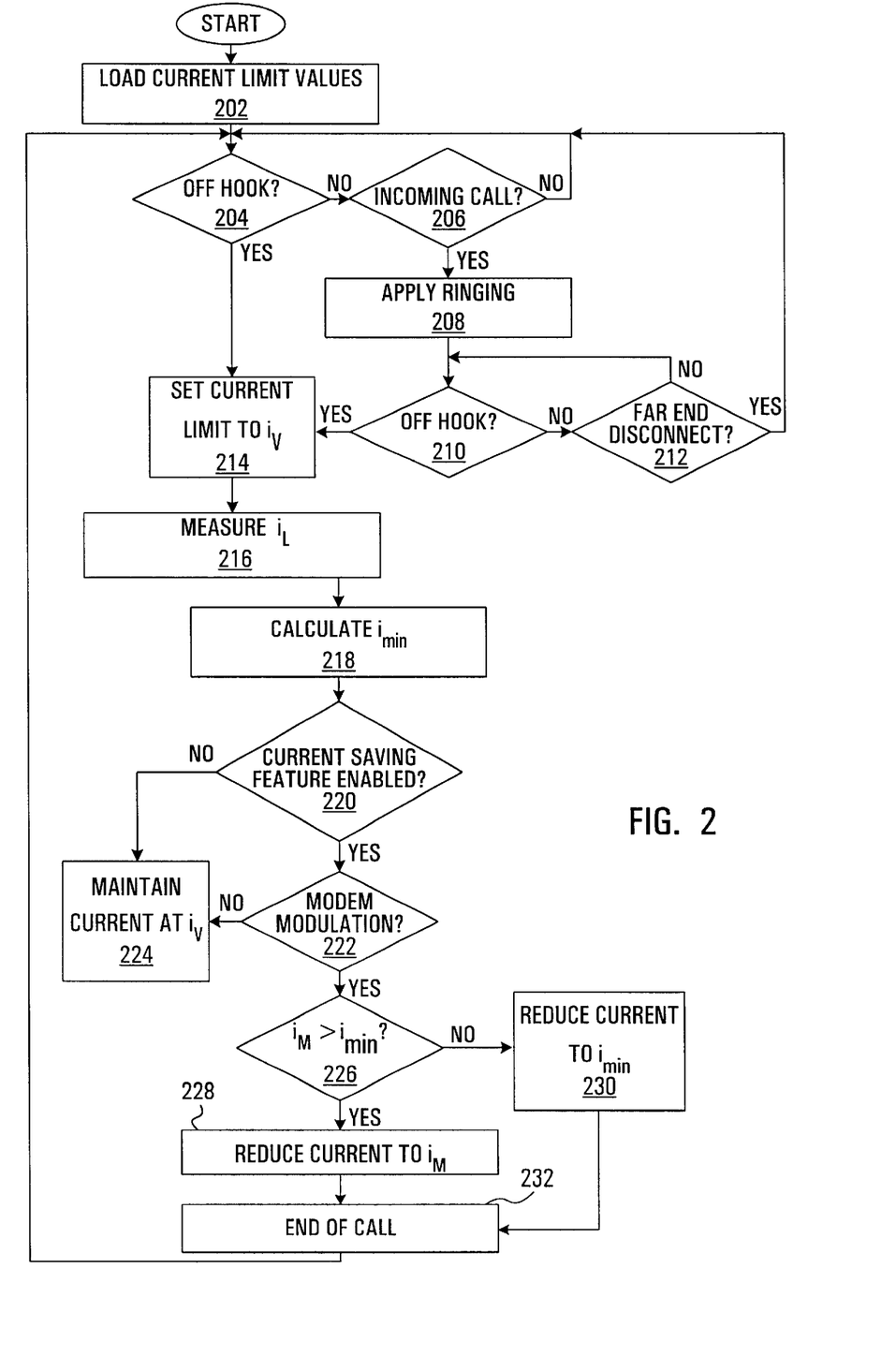
FIG. 2 is a flow chart illustrating the steps, according to the preferred embodiment, performed during the procedure of the present invention.

With reference to FIG. 2, the steps performed within the DSP 152 according to the preferred embodiment of the present invention are now described. Initially, as depicted within step 202, dc current limit values corresponding to the specific implementation of the present invention are loaded within the DSP 152. These values comprise the voice current value $i_V$, the modem current value $i_M$, and a signal current required value $i_S$ which is the minimum current on the telephone line loop 120 required if no longitudinal current is induced in the telephone wires 121,122. In one embodiment, these values are set as follows:

$i_V$=50 mA
$i_M$=18 mA
$i_S$=2 mA

In the preferred embodiment of the present invention, the current limit values are input to the DSP 152 via the digital switches. In another embodiment, the current limit values are programmed in during the manufacturing of the DSP 152. In yet another embodiment, the DSP 152 is input with the current limit values via an additional input port not shown on FIG. 1. Once input, the current limit values are saved within the DSP 152 so as to be accessible throughout the following procedural steps.

Subsequent to the loading of the current limit values at step 202, a cyclical procedure is performed within the DSP 152. Steps 204 through 212 of this procedure are well known and understood. During the first step of this cyclical procedure, as depicted at step 204, the DSP 152 monitors for an "off hook" signal from a telephone station. The telephone station in this circumstance is simply the electronic device connected to the subscriber telephone line loop 120 that could comprise a telephone handset, a modem, or other data communication device such as a facsimile machine. The DSP 152 monitors for the "off hook" signal by examining the loop feed current $i_F$ with use of the first differential amplifier 150 and the first A/D converter 153 and comparing it to a predetermined threshold value, typically in the range of 5–10 mA. The detection of an "off hook" signal indicates that the telephone station is in use while the absence of the "off hook" signal indicates that the telephone station is in an inactive state.

In parallel with the monitoring of the "off hook" signal at step 204, an incoming call indication is monitored for at step 206. This incoming call could be a voice or data communication. If both an "off hook" signal and an incoming call are not detected, the cyclical procedure continues with step 204 and 206. Therefore, prior to an outgoing call being initiated or an incoming call being received, the procedure, according to the preferred embodiment of the present invention, monitors continuously these two indications.

If an incoming call is detected at step 206, alert indications are given to the telephone station at step 208. These indications could include, but are not limited to, a ringing of the telephone station or the triggering of a flag within the telephone station. After the alerting of the telephone station is complete, FIG. 2 depicts, at step 210, the continuation of the monitoring of the "off hook" signal. In fact, the monitoring of the "off hook" signal continues throughout the alerting of the telephone station at step 208. The detection of the "off hook" signal, after the commencing of the alerting at step 208, indicates that the incoming call is being answered at the telephone station side.

If the "off hook" signal is not detected at step 210, a determination is made whether there has occurred a far end disconnection as depicted at step 212. A far end disconnection may occur in a number of circumstances including if the far end party had hung up or a time delay had been exceeded for waiting for the telephone station to answer the call. If a far end disconnect is not detected, the monitoring of the "off hook" signal continues at step 210. If a far end disconnect indication is detected at step 212, the cyclical procedure returns to step 204 and 206, in which it monitors for an outgoing or incoming telephone communication.

In the case that, at step 204 or step 210, the "off hook" signal was detected by the DSP 152, the loop feed current $i_F$ is limited to the voice current value $i_V$ at step 214. This is done, in the preferred embodiment, in order to ensure there is sufficient current in the case that the telephone station is a standard telephone handset. The setting of the loop feed current $i_F$ takes place with use of a current feedback loop comprising the first differential amplifier 150, the first A/D converter 153, the DSP 152, the D/A converter 155, and the FET 149. Using the first differential amplifier 150 and the first A/D converter 153, the DSP 152 is input, as described herein above, with a digital stream equivalent to the loop feed current $i_F$. With this information, the DSP 152 determines the adjustments required to maintain the loop feed current $i_F$ at the voice current value $i_V$. The DSP 152 controls the loop feed current $i_F$ by outputting an appropriate digital stream from the DSP 152 to the D/A converter 155. This digital stream is converted to an analog signal subsequently input to the gate of the FET 149. The voltage on the gate of the FET 149 determines the current flow through the FET 149 and hence the loop feed current $i_F$ flowing through the subscriber telephone line loop 120.

After the setting of the loop feed current $i_F$ to the voice current value $i_V$ at step 214, the longitudinally induced current $i_L$ is measured at step 216. With use of the second differential amplifier 151 and the second A/D converter 154, a digital stream proportional to the longitudinal induced current $i_L$ is input, as previously described, to the DSP 152. With this information, the DSP 152 calculates a minimum current value $i_{min}$ at step 218. The minimum current limit $i_{min}$ is equal, in the preferred embodiment of the present invention, to the sum ($i_S+i_L$) of the signal current required value $i_S$ and the maximum magnitude of the longitudinally induced current $i_L$. When the loop feed current $i_F$ is set to the minimum current value $i_{min}$, the current traversing the telephone line loop 120 is ensured to be greater than the longitudinally current $i_L$ by the signal current required value $i_S$. Assuming that the signal current required value $i_S$ is chosen properly, this will ensure that the FET 149 remains correctly biased and the overall data connection remains virtually noise free. As well, this minimum current value $i_{min}$, in the preferred embodiment, is sufficient for the DSP 152 to sense the "off hook" and "on hook" signals when terminating a session utilizing the minimum current value $i_{min}$.

Subsequent to the calculation of the minimum current value $i_{min}$ at step 218, a determination is made at step 220 whether the current saving feature is enabled. This current saving feature is a flag that is triggered in similar fashion to the loading of the current limit values described at step 202. In the preferred embodiment, the flag is triggered via the digital switches while in other embodiments it is permanently triggered during manufacturing or selectively triggered via another port within the DSP 152.

In the case that the current saving feature is enabled at step 220, a determination, in the preferred embodiment, is made at step 222 of whether the telephone station is a modem. In other embodiments, as will be described herein below, a determination is made concerning whether the telephone station is another locally powered device such as a facsimile machine.

The identification of the telephone station as a modem, in preferred embodiments, is done through well known and understood modem modulation detection techniques such as modem handshake detection. In one embodiment, a modem detection system is utilized in which the DSP 152 monitors for numerous standard modem protocols and handshake algorithms. This is similar to that disclosed within U.S. Pat. No. 5,491,720 entitled "Method and system for automatically determining data communication device type and corresponding transmission rate" by Davis et al, and incorporated herein by reference. For this embodiment, if any of these known modem protocols are detected, it is concluded that the telephone station is a modem, though it is noted that the particular modem protocol detected is not of importance.

If it is found that the telephone station is not a modem at step 222 or if the current saving feature is disabled at step 220, the loop feed current $i_F$ is maintained at the voice current value $i_V$ as depicted at step 224.

If, at step 222, it is found that the telephone station is a modem, a comparison is made, as depicted at step 226, between the modem current value $i_M$ and the minimum current value $i_{min}$. In the case that the modem current value $i_M$ input at step 202 is greater than the minimum current value $i_{min}$ calculated at step 218 than the loop feed current $i_F$ is reduced from the voice current value $i_V$ to the modem current value $i_M$ as shown at step 228. If the desired modem current level set at step 202 with the modem current value $i_M$ is less than the minimum allowable current set by the minimum current value $i_{min}$, then the loop feed current $i_F$ becomes, at step 230, the minimum current value $i_{min}$. Hence, the larger of the two current values determines the loop feed current $i_F$ through the subscriber telephone line loop 120 according to the preferred embodiment of the present invention. The reducing of the loop feed current $i_F$, at step 228 or 230, is done in similar fashion to the setting of the loop feed current $i_F$ to the voice current value $i_V$ at step 214.

At the end of the call, depicted at step 232 after the completion of step 224, 228, or 230, the cyclical procedure returns to step 204 in which the "off hook" signal is monitored for.

Figure 3:
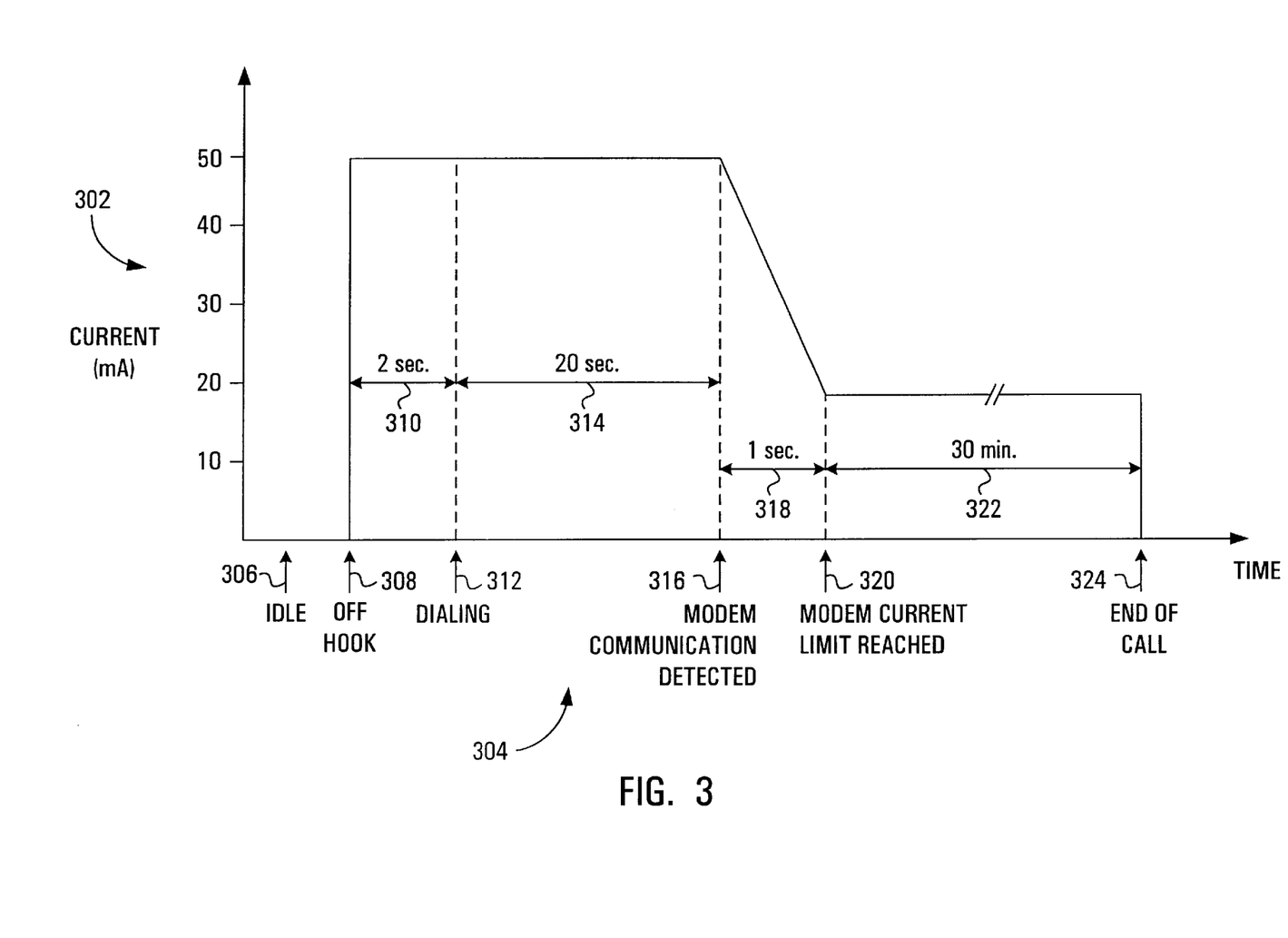
FIG. 3 is a sample plot illustrating the current levels during a modem hook-up according to the preferred embodiment of the present invention.

A sample plot that depicts the loop feed current $i_F$ at various times during a possible initiation of a modem data session, according to one embodiment of the present invention, is now described with reference to FIG. 3. The vertical axis 302 represents the quantity of loop feed current $i_F$ traversing the telephone line loop 120 in milliamps (mA). The horizontal axis 304 corresponds to various times and time periods. It is noted that the horizontal axis 304 is not to scale, but significant time periods are indicated with approximate time values.

The first time period within this plot is an idle period 306 in which no "off hook" signal or incoming call is detected, as described at steps 204 and 206. At time 308 an "off hook" is detected which begins a time period 310 of approximately 2 seconds in which the modem prepares to dial an outgoing telephone number. Starting at time 312, proceeding through time period 314 of approximately 20 seconds, and ending at time 316, the modem performs a dialling procedure and establishes communications with the called party's modem. At time 316, the use of modem communications are detected at the DSP 152 with means as described herein above. Between the time 308 and the detection of modem communications at time 316, the loop feed current level is set to the voice current value $i_V$, in this example having a value of 50 mA.

After the detection of the modem communications at time 316, the loop feed current $i_F$ is reduced over time period 318 of approximately 1 second, to the modem current value $i_M$, in this example having a value of 18 mA. This transitional period is sufficiently short since the length of time of typical modem communications are normally relatively long, therefore making the transitional period overall fairly insignificant. The loop feed current $i_F$ is set to the modem current limit $i_M$ from time 320, throughout the modem session 322, until the end of the modem data session at time 324.

There are numerous advantages of reducing the dc current during modem communications. The majority of the benefits are found at the central telephone office, though a number of advantages are found for the individual subscribers. One key benefit for the central office is the power savings, and subsequent financial savings, that is had by reducing the dc current traversing telephone lines being used by modems. This reduction in power is reasonably significant for a large telephone company, but it should be noted that it will become more significant as more people spend an increasing time on the Internet. Since peak Internet usage coincides with peak electrical demand, the decrease in power consumption described for the present invention by the central telephone office becomes even more significant.

The reduced current flow through the line interface circuits during modem operations results in a reduction in the overall temperature of the line interface circuits. This benefits the central telephone office through reduced air conditioning demands due to the cooler overall operating temperatures. As well, the cooler operation increases the reliability of operation for the line interface circuits and therefore should reduce the frequency of replacement for the line interface circuits.

One advantage of the present invention for individual modem users is with respect to modems that allow dc current to traverse the transformer within the modem. In such cases, the user of the modem should find that the decrease in dc current results in the ac information signal being significantly clearer.

Although the preferred embodiment of the present invention is described in detail herein above, there are numerous possible alternative embodiments. The above described preferred embodiment utilized a DSP while the same functions could be implemented within an analog/digital discrete circuit. As well, within the line interface circuit, a solid state subscriber line interface circuit (SLIC) could equally be used for the transformer describer herein above. The preferred embodiment has a separate DSP for each line interface circuit while an alternative implementation could have the DSP as a central resource in which a plurality of line interface circuits have access.

Another embodiment of the present invention has the loop feed current $i_F$ within the subscriber telephone line loop 120 reduced to virtually zero. This can be done by including an additional component that selectively couples the node between the ring winding 144 and the FET 149 to ground. In such a case, the ac current has a passive low resistance path to ground on both the tip and ring, resulting in balanced and relatively undistorted signals. The key difficulty with this implementation is the reduced capability for detecting the "off hook" and "on hook" signals. This is solved within this implementation by the DSP monitoring the communication between the two modems. With the absence of a modem handshake, an end of a modem call is detected.

Another embodiment of the present invention does not include the calculation of a minimum current value $i_{min}$. In this implementation, the current limiting circuit is more complex with additional components that allow the circuitry to source and sink current with no crossover distortion. This requires an additional transistor connected to a higher voltage, such as ground, that is operational if the current proceeds to reverse in direction. With such an implementation, the affects of the longitudinal current $i_L$ can be ignored, making the minimum current value $i_{min}$ calculation unnecessary.

Yet further embodiments allow for the detection of other telephone stations that are locally powered, such as facsimile machines, that do not require the dc current normally traversing the telephone line loop. Facsimile machines may be detected by well known modulation techniques similar to that used for modems discussed herein above. In one embodiment, the facsimile machines are detected with use of a handshake detector as disclosed within U.S. Pat. No. 5,699,414 entitled "Method and Apparatus for Sharing a Single Telephone Line Between a Facsimile Machine, Data Modem, Telephone Answering Device, and a Person" by Telibasa and assigned to TT Systems Corporation of Yonkers, New York, herein incorporated by reference.

Although all of the above described implementations are for a single DSP 152 for every line interface circuit, one skilled in the art would understand that the present invention could equivalently be implemented with discrete components such as operational amplifiers or Field Programmable Gate Arrays (FPGAs). As well, a single DSP 152 could be utilized for a plurality of line interface circuits in order to reduce financial costs of the implementation.

Persons skilled in the art will appreciate that there are alternative implementations and modifications possible to use an apparatus similar to that described above to limit telephone line current in cases of data communications, and that the above implementation is only an illustration of this embodiment of the invention. The scope of the invention, therefore, is only to be limited by the claims appended hereto.

What is claimed is:

1. A control apparatus capable of being implemented within a line interface circuit coupled to a telephone station via a telephone line loop arranged to carry an ac current representative of voice or data and a dc current for powering a standard telephone handset, the control apparatus controlling operation of the line interface circuit by means of control logic operating within the control apparatus; and wherein the control logic operates to set the dc current on the telephone line loop to a predetermined first dc current level, to determine if the telephone station is of a first device type which requires less dc current on the telephone line loop than a standard telephone handset, and to set the dc current on the telephone line loop to a second lower dc current level if the telephone station is of the first device type.

2. A control apparatus according to claim 1, wherein the first device type is a communication device that is locally powered.

3. A control apparatus according to claim 2, wherein the first device type is a data modem.

4. A control apparatus according to claim 2, wherein the first device type is a facsimile machine.

5. A control apparatus according to claim 1, wherein to determine if the telephone station is of a first device type, the control apparatus detects a distinctive modulation corresponding to the first device type.

6. A control apparatus according to claim 1, wherein the control logic further operates to calculate a minimum dc current level required for proper operation of the line interface circuit and to set the second dc current level equal to the minimum dc current level.

7. A control apparatus according to claim 1, wherein the control logic further operates to calculate a minimum dc current level required for proper operation of the line interface circuit, to compare the minimum dc current level with a minimum dc current level for operation of the first device type, and to set the second dc current level at the greater of the two minimum levels.

8. A control apparatus according to claim 1, capable of controlling operation of a plurality of line interface circuits, each line interface circuit coupled to a telephone station via a telephone line loop, the control apparatus controlling operation of each line interface circuit by means of the control logic operating within the control apparatus.

9. A control apparatus according to claim 1 comprising a digital signal processor (DSP), wherein the control logic is control software running on the DSP.

10. A control apparatus according to claim 1 comprising a plurality of discrete components.

11. A line interface circuit incorporating the control apparatus of claim 1, the line interface circuit further comprising a communication apparatus for transmitting and receiving voice or data on the telephone line loop, a dc current detection apparatus for detecting the dc current on the telephone line loop, and a dc current adjustment apparatus for setting the dc current on the telephone line loop; and
wherein the communication apparatus, the dc current detection apparatus, and the dc current adjustment apparatus are independently coupled between the telephone line loop and the control apparatus, and the control apparatus is coupled to an external apparatus.

12. A line interface circuit according to claim 11, wherein to set the dc current on the telephone line loop to at least one of a predetermined first dc current level and a second dc current level, the control apparatus controls the input to the dc current adjustment apparatus.

13. A line interface circuit according to claim 11, wherein to determine if the telephone station is of a first device type, the control apparatus monitors the outputs from the communication apparatus.

14. A line interface circuit according to claim 11, wherein the dc current detection apparatus comprises at least one differential amplifier and at least one analog-to-digital (A/D) converter coupled in series between the telephone line loop and the control apparatus; and
wherein the inputs to the differential amplifier are configured such that the output voltage is proportional to the dc current on the telephone line loop.

15. A line interface circuit according to claim 14, wherein the dc current detection apparatus comprises a second differential amplifier and a second A/D converter coupled in series between the telephone line loop and the control apparatus; and
wherein the inputs to the second differential amplifier are configured such that the output voltage is proportional to a longitudinally induced dc current on the telephone line loop.

16. A line interface circuit according to claim 11, wherein the dc current adjustment apparatus comprises a digital-to-analog (D/A) converter input with a digital stream from the control apparatus and a control device input with a control signal from the D/A converter; and
wherein the telephone line loop comprises tip and ring telephone lines, the line interface circuit further comprises tip and ring power terminals coupled to the end of the tip and ring telephone lines respectively, and the control device, coupled in series with at least one of the tip and ring power terminals, controls the dc current on the telephone line loop.

17. A line interface circuit according to claim 16, wherein the control device is a field-effect transistor.

18. A line interface circuit according to claim 11, wherein the dc current adjustment apparatus comprises a switch device input with a control signal from the control apparatus; and
wherein the telephone line loop comprises tip and ring telephone lines, the line interface circuit further comprises tip and ring ground terminals coupled to the end of the tip and ring telephone lines respectively, and the switch device, coupled in series with at least one of the tip and ring ground terminals, selectively sets the dc current on the telephone line loop to zero.

19. A line interface circuit according to claim 11, wherein the telephone line loop comprises tip and ring telephone lines; and
wherein the communication apparatus comprises audio circuitry coupled to the control apparatus and a transformer comprising a primary winding coupled to the audio circuitry, a tip winding coupled to the tip telephone line, and a ring winding coupled to the ring telephone line.

20. A line interface circuit according to claim 11, wherein the communication apparatus comprises audio circuitry and a solid state subscriber line interface circuit coupled in series between the control apparatus and the telephone line loop.

21. A line interface circuit according to claim 11, wherein the control logic further operates to detect a peak induced ac current with use of the dc current detection apparatus, to calculate a minimum dc current level required for proper operation of the line interface circuit, and to set the second dc current level equal to the minimum dc current level; and
wherein to calculate a minimum dc current level, the control logic sums the peak induced ac current with a third dc current level representing the minimum dc current level required for proper operation of the line interface circuit in absence of induced ac current.

22. A line interface circuit according to claim 11, wherein the control logic further operates to detect a peak induced ac current with use of the dc current detection apparatus, to calculate a minimum dc current level required for proper operation of the line interface circuit, to compare the minimum dc current level with a minimum dc current level for operation of the first device type, and to set the second dc current level at the greater of the two minimum levels; and wherein to calculate a minimum dc current level, the control logic sums the peak induced ac current with a third dc current level representing the minimum dc current level required for proper operation of the line interface circuit in absence of induced dc current.

23. A line interface circuit according to claim 22, wherein the predetermined first dc current level, the minimum dc current level for operation of the first device type, and the minimum dc current level required for proper operation of the line interface circuit in absence of induced dc current are input to the control apparatus prior to the operation of the control logic.

24. In a control apparatus capable of being implemented within a line interface circuit coupled to a telephone station via a telephone line loop arranged to carry ac current representative of voice or data and a dc current for powering a standard telephone handset, a method of controlling the dc current on the telephone line loop, the method comprising the steps of:

setting the dc current on the telephone line loop to a predetermined first dc current level;

determining if the telephone station is of a first device type which requires less dc current on the telephone line loop than a standard telephone handset; and setting the dc current on the telephone line loop to a second lower dc current level if the telephone station is of the first device type.

* * * * *

UNITED STATES PATENT AND TRADEMARK OFFICE
CERTIFICATE OF CORRECTION

PATENT NO. : 6,480,603 B1
DATED : November 12, 2002
INVENTOR(S) : Rolf Georg Meier It is certified that error appears in the above-identified patent and that said Letters Patent is hereby corrected as shown below:

<u>Title page,</u>
Item [56], References Cited, U.S. PATENT DOCUMENTS, insert Patent No. -- 5,737,411 --, which was omitted.

Signed and Sealed this

Third Day of June, 2003

JAMES E. ROGAN
*Director of the United States Patent and Trademark Office*